United States Patent [19]

Collins et al.

[11] 3,979,199
[45] Sept. 7, 1976

[54] TREATMENT OF PHOSPHATE ROCK IN SOIL TO PROVIDE FERTILIZER AND GYPSUM

[75] Inventors: Dwight D. Collins, Bakersfield; Fred W. Lauer, Jr., Hillsborough, both of Calif.

[73] Assignee: Chemsoil Corporation, Bakersfield, Calif.

[22] Filed: Mar. 10, 1975

[21] Appl. No.: 557,017

Related U.S. Application Data

[63] Continuation of Ser. No. 371,877, June 20, 1973, abandoned.

[52] U.S. Cl. .......................................... 71/40; 71/53
[51] Int. Cl.² ............................................ C05B 1/00
[58] Field of Search ................ 71/1, 38, 40, 33, 53, 71/64 SC, 63

[56] References Cited
UNITED STATES PATENTS

| | | | |
|---|---|---|---|
| 1,222,112 | 4/1917 | Lipman | 71/33 |
| 1,326,533 | 12/1919 | Sedtler | 71/38 |
| 1,819,464 | 8/1931 | Holz | 71/38 X |
| 2,097,446 | 11/1937 | Clarborne | 71/33 |
| 2,499,767 | 3/1950 | Maust | 71/64 MAX |
| 3,177,062 | 4/1965 | Hignett et al. | 71/64 DA X |
| 3,337,989 | 8/1967 | Harmon | 71/1 X |
| 3,697,248 | 10/1972 | Betts | 71/38 |

*Primary Examiner*—Charles N. Hart
*Assistant Examiner*—Ernest G. Therkorn
*Attorney, Agent, or Firm*—Donald D. Mon

[57] ABSTRACT

Pulverized phosphate rock is spread onto or mixed into soil which is to be fertilized. The soil is then treated with a solution of sulfurous acid, usually the output of a device which burns sulfur in air to form sulfur dioxide and then dissolves the sulfur dioxide in water. The water may be irrigation water which thereupon both irrigates the soil and reacts with the phosphate rock to fertilize the soil. Common phosphate ores include a substantial amount of calcium, with which, and with oxygen, the sulfurous acid reacts to form gypsum (calcium sulfate). Gypsum is a widely-used corrective substance applied to croplands, and the gypsum formed by this treatment reduces the requirement to purchase gypsum as a product separate from the fertilizer. Substantially all of the phosphorus contained in the rock can ultimately be solubilized as "available phosphate", with the use of this process.

5 Claims, No Drawings

TREATMENT OF PHOSPHATE ROCK IN SOIL TO PROVIDE FERTILIZER AND GYPSUM

This is a continuation of application Ser. No. 371,877, now abandoned, filed June 20, 1973.

This invention relates to fertilizing of croplands, and in particular to a process which enables pulverized phosphate rock to be applied directly to the soil to be fertilized, with a subsequent release of phosphorus greatly in excess of that which could be secured from solubilization with untreated irrigation water. The process of this invention simultaneously creates gypsum in the soil.

The use of phosphate fertilizers is widespread. The most common source of phosphate fertilizers is phosphate rock, which contains various phosphorus compounds, some of which are readily solubilized in neutral or nearly neutral aqueous solutions, such as irrigation water. These phosphorus compounds provide phosphorus values, and these phosphorus values are commonly called "available phosphate". Available phosphates represent only a fraction of the total phosphorus compounds in phosphate rock, but the remaining portion is not practically solubilized by common irrigation waters, and if it becomes "available phosphate" at all, it is over a long period of time measured in years. Basically, all phosphorus compounds represent potentially useful fertilizer, and to the extent they are not brought into aqueous solution, they represent a substantial economic loss, and the waste of a natural resource.

Phosphate rock, when very finely pulverized, has historically had important but limited use as a fertilizer itself. Its limitations are chiefly the consequence of the small proportion of available phosphate they contain, and the slow rate at which even that proportion is solubilized. Consequently, the preponderant usage of phosphate rock for fertilizer is as a raw material for the manufacture of phosphoric acid and of superphosphate. Superphosphate is phosphate rock treated by various processes, primarily involving sulfuric acid, to increase the percentage of available phosphate. To make superphosphate, it is an economic necessity to provide a sulfuric acid plant near the place of treating the rock, and this is a costly installation. A disadvantage in using superphosphate as a fertilizer is that, as the available phosphorus is solubilized in the soil from it, the residual calcium product (calcium forming a substantial proportion of the phosphate rock) is likely to be other than the sulfate, and this residual component will later require corrective treatment of the soil, such as the addition of gypsum. In fact, the treatment of commercial croplands with gypsum is a very common operation.

It is an object of this invention to enable raw phosphate rock to be applied directly to the cropland, there to be treated with a previously treated water which will solubilize a greater proportion of the phosphorus values in the rock than is possible by direct water leaching of the rock with irrigation water, or by the slow dissolution of the rock caused by plant juices. In fact, over a period of time, substantially all of the phosphorus values can be solubilized in the treated water. In addition, a substantially greater residue of the treated rock will be calcium sulfate, and this will greatly reduce, and in some cases even eliminate, the requirement for a supplementary supply of gypsum.

The method according to this invention is to apply pulverized phosphate rock containing phosphorus and calcium to soil to be fertilized, and applying to the soil and to the rock in situ an aqueous solution of sulfurous acid, whereby to solubilize phosphorus values from the rock and to form gypsum in situ.

According to a preferred but optional feature of the invention, the sulfurous acid comprises sulfur dioxide gas dissolved in irrigation water, preferably as the consequence of the burning of sulfur in air, and the subsequent absorption of the resulting sulfur dioxide in the irrigation water. The said addition of sulfur dioxide gas to water is sometimes referred to as "infusion," and the resulting water as "water into which sulfur dioxide gas has been infused" or "infused water."

The above and other features of this invention will be fully understood from the following detailed description.

Phosphate rock is obtained from mines in the United States, and its constituents vary with its source. In general, this rock is a relatively complicated mixture of compounds which are conveniently expressed as oxides of the mineral metals contained therein. Classically, phosphorus is reported as $P_2O_5$, even though the phosphorus compound might be, and often is, something else. The $P_2O_5$ content of most phosphate rock is usually about 32 percent of the dry weight. Calcium oxide forms about 46 percent. The remainder is variously iron, aluminum, magnesium, carbon, and silicon reported as oxides. Only some of the $P_2O_5$ is "available" by solubilizing with neutral water, and this proportion is often reported as "available phosphate".

The direct application of water to phosphate rock will solubilize a certain amount of the phosphorus values and make them directly available to the soil. However, this is a low-yield process and obtains only a relatively small proportion of the phosphorus values contained in the rock. Furthermore, it does not provide gypsum. Instead, the calcium residue will be in other compounds, such as carbonates or bicarbonates which require later correction of the soil, usually by way of application of gypsum.

To overcome certain of the disadvantages inherent in the direct application of phosphate rock, the phosphate rock is typically treated with sulfuric acid at a fertilizer plant to produce such compounds as monocalcium phosphate which increases the percentage of available phosphate, but which produces little gypsum. It is also known to manufacture triple superphosphate by treating phosphate rock with phosphoric acid to obtain an even greater proportion of available phosphate, but this process has the disadvantage that little of the calcium in the rock ultimately becomes gypsum.

By the use of this invention, substantially all of the phosphorus values in the phosphate rock can ultimately be solubilized from the rock. This additional recovery is obtained at a substantial economic saving by eliminating the need for treatment of the rock with sulfuric acid in a fertilizer plant and by providing a substantial gypsum residue in situ which saves the farmer the cost of purchasing and applying gypsum at a later date.

This process utilizes sulfurous acid which can expeditiously be produced in portable sulfur burners that are used in the field to form sulfur dioxide gas and dissolve it in irrigation water. An example of such a burner is shown in Mattson U.S. Pat. No. 3,627,134, issued Dec. 14, 1971, entitled "Water Treatment Device". It is a characteristic of sulfur-burning devices that a closed chamber is provided wherein a charge of sulfur is burned in the presence of a stream of air passed therethrough. The effluent gas stream comprises the products of combustion, principally, sulfur dioxide and the unreacted components of air such as nitrogen. The sulfur dioxide is dissolved in irrigation water, for example in a stream or pond of irrigation water, or in a portion of such a stream or pond, this portion being returned to the stream or pond where it is diluted. The water becomes a dilute solution of sulfurous acid.

Burner devices of the foregoing type are readily portable, and are often mounted on trailers so as to be movable from place to place. They can be operated without continuous control of an operator. Usually, they remove a portion of the irrigation flow in a ditch, inject the sulfur dioxide in it, and return this treated water to the ditch. Such a device can replace in the farmer's field the requirement for a sulfuric acid plant at a fertilizer plant, and can reduce the need to purchase gypsum, simply by providing an inexpensive source of sulfurous acid. Sulfurous acid, for the purposes of this invention, is defined as the substance produced by the solution or absorption of sulfur dioxide in water.

To practice this invention, finely pulverized raw phosphate rock, i.e., rock which has been untreated by sulfuric acid (it may have been washed and calcined at the mine) is screened to a size generally smaller than grains of rice (100 mesh is a good size) and is distributed on the soil at a rate of approximately 300–600 pounds of rock per acre. The rock may be applied by any suitable means. Common examples are by means of spreaders, spreading the rock as a component of a slurry sprayed or otherwise distributed onto the soil, or distributing it along with irrigation water. After application, the rock can be worked into the ground or it can be left on the surface as preferred. When the cropland is to be irrigated, the irrigation water will be supplied as an aqueous solution of sulfurous acid by dissolving sulfur dioxide into the water. This aqueous solution is applied directly to the cropland, both for the purpose of irrigation and for the purpose of reacting with the phosphate rock.

Because the reaction with the rock is an acid-base reaction, it is necessary to neutralize all bases in the water (primarily calcium and magnesium compounds) and in the soil, and to convert to sulfites all those oxides in the water and in the soil which will behave as bases (primarily iron and aluminum compounds), before the sulfurous acid can react with the phosphorus values to release them. Therefore, a sufficient stoichiometric quantity of sulfurous acid will be added to neutralize these bases and to react with those oxides, plus an amount to react with the phosphorus values. This latter amount will react to produce phosphoric acid and gypsum. The phosphoric acid is available for use by the plants. The gypsum is formed from the reaction of calcium ion in the rock and sulfite ion in the sulfurous acid to form calcium sulfite. The calcium sulfite reacts with atmospheric oxygen to form calcium sulfate. In fact, some of the sulfite radical will be oxidized to sulfate radical, and some calcium sulfate will be formed directly.

By the time the soil has dried, the above reactions will have taken place, and stable compounds will have resulted. Under these circumstances, a considerable quantity of acid will have been placed into the ground, but in a manner which is not deleterious to farming equipment. Sulfur-burning equipment is readily manufactured to process the effluent sulfur dioxide gas. The pH of the irrigation water will ordinarily be maintained between about 2.0 and about 7.0, depending on the type of equipment being used. For example, the preferred pH range is between 4.0 and 5.0, and in systems which are not especially sensitive to corrosion, this range will be used. However, when sprinklers are to be used to spread the water, a less acidic solution will have to be used on the order of about pH 6.2, and accordingly, the reaction with the ore may be somewhat slower. A more acidic solution accelerates the reactions.

It is also a convenient means of operating this invention to treat the irrigation water first, and store it for a time in a pond. This reacts the substances in the water before the treated water is applied to the ground. This can enable the farmer to maintain a closer control over the process and to be certain that the bases and base-reacting materials will have been reacted with, and that an excess of sulfurous acid is present in the pond. Then adequate sulfurous acid will more certainly be present to treat the phosphate rock.

A series of in vitro tests has been conducted to determine the effectiveness of this process in providing phosphorus values. In these tests, a test soil which was low in available phosphate was used as the basis for analysis. All of it passed a 300-mesh screen. Its level of available phosphate is shown in the table below. One sample of the untreated soil was taken and used as a control. Two identical samples of the untreated soil were mixed with commercial phosphate rock, also ground to pass a 300-mesh screen, the total sample comprising about 10% by weight of the rock. The control sample, and one of the rock-containing samples, were saturated with de-ionized water for 24 hours. The other rock-containing sample was saturated for 24 hours with de-ionized water initially containing 0.20 percent (2,000 parts per million) of $SO_2$. It was known that the stoichiometric amount involved was sufficient to react with the bases and base-reacting substances in the soil and in the water.

Samples of the liquid which was in contact with the samples were taken after 24 hours, and were analyzed for phosphate values, expressed as $P_2O_5$ on the basis of the phosphorus content. The results were as follows:

| SAMPLE | | $P_2O_5$ lb/A6″ |
|---|---|---|
| (a) | Control sample with de-ionized water | 22 |
| (b) | Sample with rock, treated with de-ionized water | 880 |
| (c) | Sample with rock, treated with de-ionized water containing $SO_2$ (sulfurous acid) | 1280 |

The term $P_2O_5$ lb/A6″ means pounds of $P_2O_5$ determined on the basis of phosphorus content, which would be found in a similar environment having an area of 1 acre and a depth of 6 inches. This is a common agricultural unit of measurement and description.

In the foregoing tests, less than 1 ppm remained in the analyzed liquid, indicating that the sulfurous acid had been consumed. It is theorized that further applications of sulfurous acid would be even more efficient, because the bases and oxides which consumed the acid prior to release of phosphorus acid would already have been reacted. There appears to be good reason to anticipate that substantially all of the phosphorus values in the rock can be converted into available phosphate in a commercially practical time span, thereby improving the phosphorus yield to the farmer from a given amount of fertilizer. While much the same recovery might be expected by using plain water, it is evident that the rate of solubilization would not be as commercially practical. Furthermore, after treatment with sulfurous acid, there remained in the soil calcium sulfite which will later react to form gypsum, which is an advantage unique to this process.

The pH of the water, and the quantity of sulfurous acid, will be determined by the farmer as a function of the corrosiveness which the equipment used can withstand, and the total amount of sulfurous acid needed to overcome the base-reacting substances and to react with the rock to release available phosphate.

This invention thereby provides a process for fertilizing cropland which markedly increases the amount of available phosphate to cropland, in situ, and provides gypsum as a by-product.

This invention is not to be limited by the examples given, but only in accordance with the scope of the appended claims.

We claim:

1. The method of providing available phosphate and gypsum to soil comprising:
    a. applying in situ to soil to be treated granules consisting essentially of phosphate rock containing phosphorus and calcium, said rock being previously untreated by sulfuric acid; and
    b. applying to the soil after application of said granules water into which sulfur dioxide gas has been dissolved whereby to solubilize phosphate values from the rock and to form gypsum in the soil in situ.

2. The method according to claim 1 in which the pH of the infused water is between about 2.0 and about 6.5.

3. The method according to claim 1 in which sulfurous acid is formed by said dissolving of sulfur dioxide, and is provided in excess of the stoichiometric quantity required to react with bases and with compounds which react as a base in the water and in the soil with the sulfurous acid, whereby said excess will react with the phosphate rock to produce available phosphate.

4. The method according to claim 1 in which the water is irrigation water, and in which this water is added to a larger body or stream of irrigation water after said dissolving of sulfur dioxide.

5. The method according to claim 4 in which the pH of the treated larger body or stream, i.e., the aqueous solution, is between about 2.0 and 6.5.

* * * * *